Nov. 17, 1953 D. W. MOLINS ET AL Re. 23,738

PHOTOELECTRIC WEIGHING MECHANISM

Original Filed July 19, 1949 13 Sheets-Sheet 1

INVENTORS
Desmond Walter Molins
Cyril Best
Edward Anthony Chandler
By Watson, Cole, Grindle & Watson
Attorneys

PHOTOELECTRIC WEIGHING MECHANISM

Original Filed July 19, 1949 13 Sheets-Sheet 2

Desmond Walter Molins
Cyril Best
Edward Anthony Chandler
INVENTORS
By Watson, Cole, Grindle & Watson
Attorneys

PHOTOELECTRIC WEIGHING MECHANISM

Original Filed July 19, 1949 13 Sheets-Sheet 3

Desmond Walter Molins
Cyril Best
Edward Anthony Chandler
INVENTORS
By Watson, Cole, Grindle & Watson
Attorneys PHOTOELECTRIC WEIGHING MECHANISM
Original Filed July 19, 1949 13 Sheets-Sheet 4
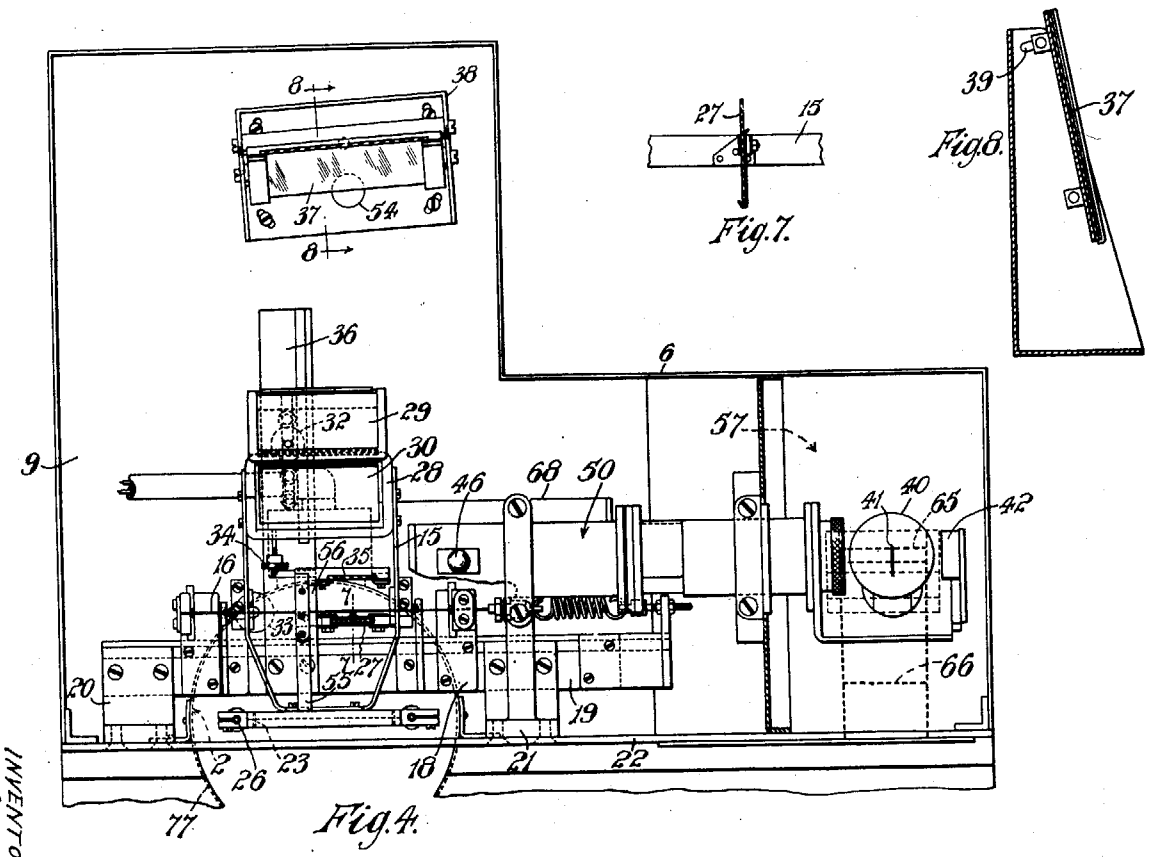
INVENTORS
Desmond Walter Molins
Cyril Best
Edward Anthony Chandler
By Watson, Cole, Grindle & Watson
Attorneys

PHOTOELECTRIC WEIGHING MECHANISM

Original Filed July 19, 1949 13 Sheets-Sheet 5

INVENTORS
Desmond Walter Molins
Cyril Best
Edward Anthony Chandler
By Watson, Cole, Grindle & Watson
Attorneys

PHOTOELECTRIC WEIGHING MECHANISM

Original Filed July 19, 1949 13 Sheets-Sheet 6

Desmond Walter Molins
Cyril Best
Edward Anthony Chandler
INVENTORS

By Watson, Cole, Grindle & Watson
Attorneys

PHOTOELECTRIC WEIGHING MECHANISM

Original Filed July 19, 1949 13 Sheets-Sheet 7

INVENTORS
Desmond Walter Molins
Cyril Best
Edward Anthony Chandler
By Watson, Cole, Grindle & Watson
Attorneys

PHOTOELECTRIC WEIGHING MECHANISM

Original Filed July 19, 1949 13 Sheets-Sheet 8

Desmond Walter Molins
Cyril Best
Edward Anthony Chandler
INVENTORS
By Watson, Cole, Grindle & Watson
Attorneys PHOTOELECTRIC WEIGHING MECHANISM
Original Filed July 19, 1949 13 Sheets-Sheet 9
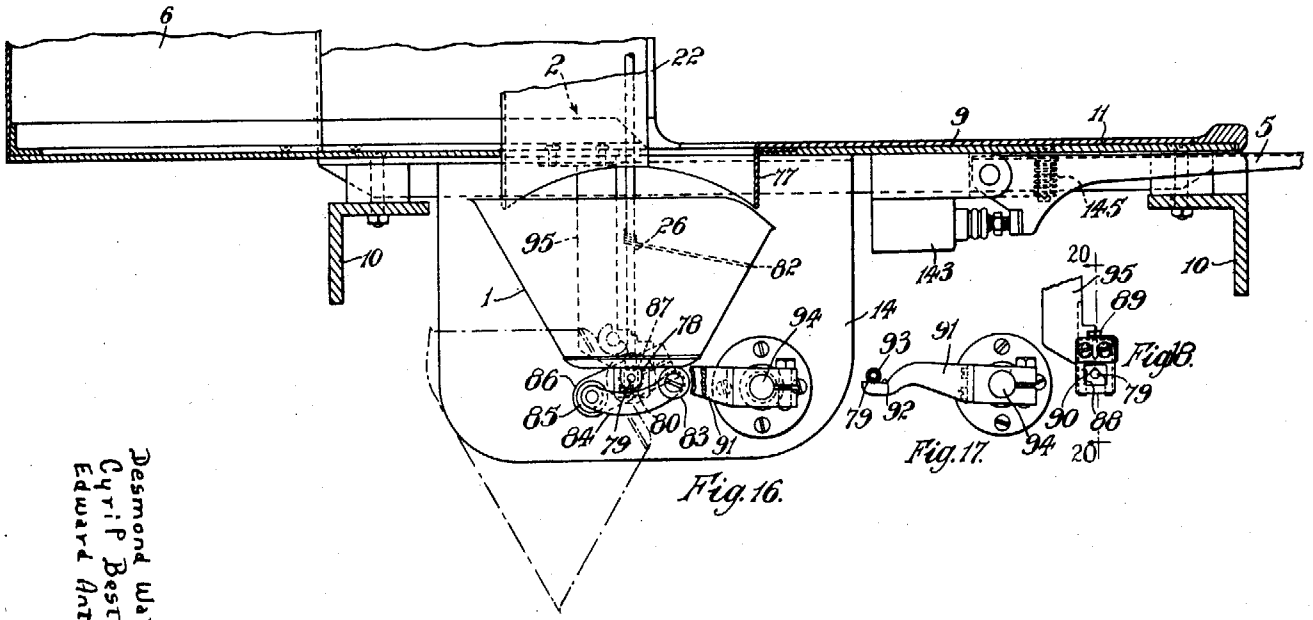
Desmond Walter Molins
Cyril Best
Edward Anthony Chandler
INVENTORS
By Watson, Cole, Grindle & Watson
Attorneys

PHOTOELECTRIC WEIGHING MECHANISM

Original Filed July 19, 1949 13 Sheets-Sheet 10

Desmond Walter Molins
Cyril Best
Edward Anthony Chandler

INVENTORS

By: Watson, Cole, Grindle & Watson

Attorneys

PHOTOELECTRIC WEIGHING MECHANISM

Original Filed July 19, 1949 13 Sheets-Sheet 11

Desmond Walter Molins
Cyril Best
Edward Anthony Chandler
INVENTORS
By Watson, Cole, Grindle & Watson
Attorneys

PHOTOELECTRIC WEIGHING MECHANISM

Original Filed July 19, 1949 13 Sheets-Sheet 12

Desmond Walter Molins
Cyril Best
Edward Anthony Chandler
INVENTORS

By Watson, Cole, Grindle & Watson
Attorneys

PHOTOELECTRIC WEIGHING MECHANISM

Original Filed July 19, 1949 13 Sheets-Sheet 13

INVENTORS
Desmond Walter Molins
Cyril Best
Edward Anthony Chandler
By: Watson, Cole, Grindle & Watson
Attorneys Reissued Nov. 17, 1953

Re. 23,738

UNITED STATES PATENT OFFICE 23,738

PHOTOELECTRIC WEIGHING MECHANISM

Desmond Walter Molins and Cyril Best, London, England, and Edward Anthony Chandler, Montreal, Quebec, Canada, assignors to Moline Machine Company Limited, London, England, a British company Original No. 2,595,803, dated May 6, 1952, Serial No. 105,632, July 19, 1949. Application for reissue April 21, 1953, Serial No. 350,276. In Great Britain July 22, 1948

9 Claims. (Cl. 265—58)

Matter enclosed in heavy brackets [ ] appears in the original patent but forms no part of this reissue specification; matter printed in italics indicates the additions made by reissue.

This invention concerns improvements in or relating to weighing mechanism.

In some continuous weighing operations, for example, where weighed quantities of material are to be packed, the material is dispensed into the scale pan of the weighing mechanism by hand. In such a case the mechanism is usually arranged to give the operator some visual indication of the weight of the material in the scale pan, but as the operations are necessarily fairly rapid, there is often a considerable risk of error which, in some cases, may be economically serious even though the magnitude of the individual errors may be small.

In the present invention there is provided weighing mechanism having means to indicate the amount of angular movement of the weighbeam, said means comprising a fixed light source and a reflector fixed to or operably coupled to the weighbeam (e. g. in the region of its pivotal axis) for angular movement therewith and arranged to intercept and reflect a light-beam from said source, on to a screen, so that on angular movement of the weighbeam, the reflected light-beam moves through twice the angle through which the weighbeam moves.

There may be provided a further reflector placed to intercept said reflected light-beam and reflect it again to the latter, whereby on angular movement of the weighbeam the light-beam finally reflected from the angularly movable reflector moves through an angle which is a multiple of the angle of movement of the first reflected light-beam.

The weighing mechanism may be adapted for weighing measured quantities of material (e. g. tobacco) in a scale pan which can be emptied (e. g. by tilting) and control means may be provided for the scale pan, said control means comprising light-sensitive means placed to receive the reflected light-beam when the weighbeam reaches or is in a selected angular position or is between two selected angular positions, and means actuated by said light-sensitive means to operate interlocking mechanism controlling the emptying of the scale pan, whereby the scale pan can be emptied only when it contains a quantity of desired weight or whose weight is within a selected range. The said control means may be so arranged as to permit the scale pan to be emptied only when the light-sensitive means receives the reflected light-beam.

The light-sensitive means may be adapted and arranged on receiving said reflected light to cause further means to be actuated to operate a signal device. Alternatively, the means to operate the signal device may be adapted to be actuated only when the said light-sensitive means does not receive said reflected light.

The screen may be so arranged that the reflected light beam falling upon it is viewed through translucent material which may be distinctively colored at that part of the screen upon which the said beam falls when the said member is at a selected position or between two selected positions.

The said signal device may include a lamp adapted to be illuminated when the reflected light beam is intercepted by the said light-sensitive means, and the said lamp may be adapted and arranged to cause light of a distinctive color to be viewed when the lamp is illuminated (e. g., the lamp may be arranged to illuminate the screen at a part which comprises distinctively colored translucent material).

Means (e. g. spring pressure means) may be provided to cause the weighbeam to move sooner than it would under the sole influence of the mass of material in the scale pan whereby the light-beam can be caused to move over the screen by weights much lower than the desired weight.

The invention will be more fully described with reference to the accompanying drawings which show, by way of example, a weighing apparatus for weighing small quantities of tobacco which are subsequently to be packed.

In the drawings:

Figure 4 is a top plan view of Figure 2, the cover of the apparatus being omitted.

Figure 7 is a vertical sectional view on line 7—7 of Figure 4.

Figure 8 is a vertical sectional view on line 8—8 of Figure 4.

Figure 16 is a sectional view taken approximately on line 16—16 of Figure 15.

Figures 17 and 18 are fragmentary views of Figure 16 showing certain details more clearly.

Figures 1, 12:
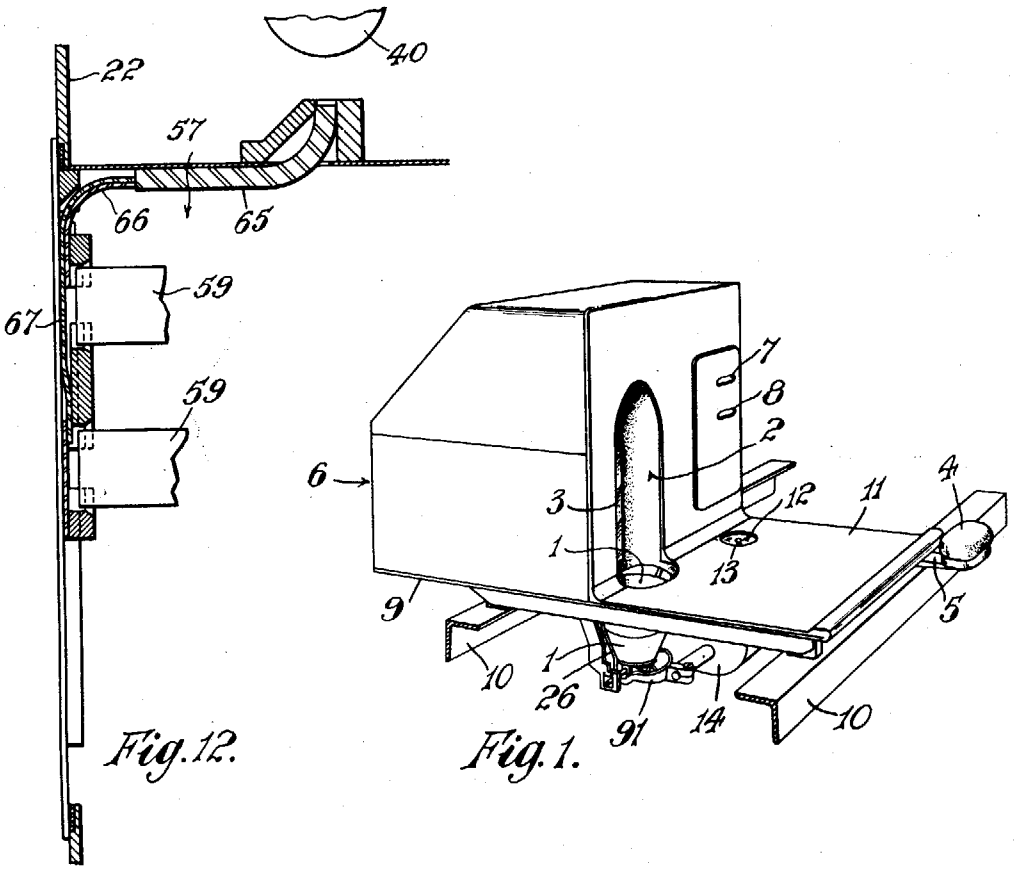
Figure 1 is a small perspective external view of the complete weighing apparatus.
Figure 12 is a local section of Figure 2 on the line 12—12.

Referring first to Figure 1 of the drawings, the apparatus is arranged so that the operator can place tobacco by hand into a scale pan 1 and at the same time watch an indicator which shows the weight of tobacco in the scale pan. The scale pan is positioned at the bottom of a cavity 2 which is of concave semi-circular cross section, and at the back of the cavity is a translucent screen 3 over which a narrow line of light moves, thus providing an indicator. When the operator is satisfied that the scale pan contains a correct or allowable weight of tobacco he empties the pan into a suitable receptacle and begins a fresh weighing operation.

In the apparatus shown, the emptying of the pan is effected by certain mechanism which will be described later, but the operation of this mechanism is initiated by the operator by pressing a pad 4 at the end of a lever 5.

Other features of Figure 1 are a casing 6 which contains the weighbeam, optical devices for forming and reflecting a light beam, a device hereafter referred to as a zone-adjuster for adjusting the instant of operation of two light sensitive cells relatively to the position of the light beam on a screen, light sensitive cells and auxiliary apparatus and electric counters whose dials or figures are visible through windows 7 and 8 at the right hand side of the casing. The casing is fixed to a base plate 9 and the latter is supported on angle iron members 10.

In the front of the apparatus is a smooth table 11 fixed above the base plate and over which the operator works, and in this table is an aperture covered by a window 12 through which a dial is visible over which a hand or pointer 13 rotates. Beneath the baseplate is a box 14 which contains mechanism for controlling the apparatus and tilting, controlling and restoring the scale pan each time a weighing is effected.

Figure 2:
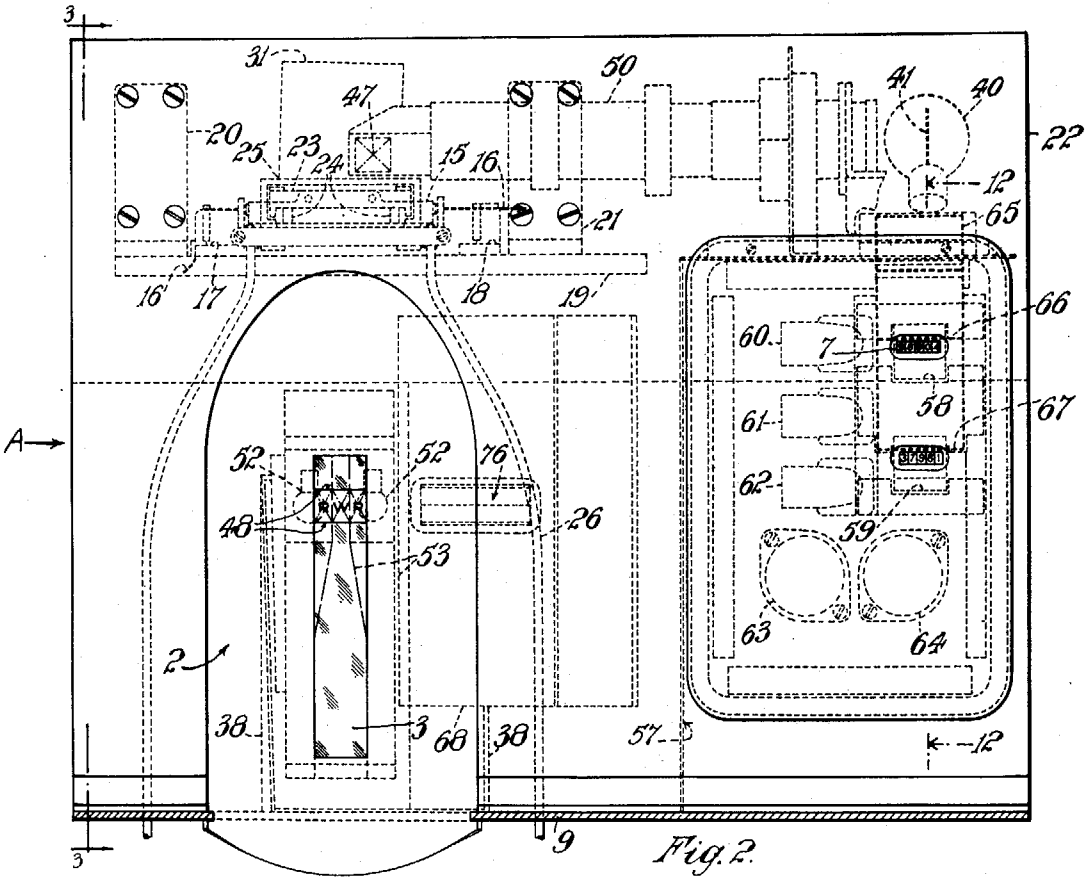
Figure 2 is a front elevation of the upper part of Figure 1 drawn to a larger scale on line 2—2 of Figure 3.
Figure 3:
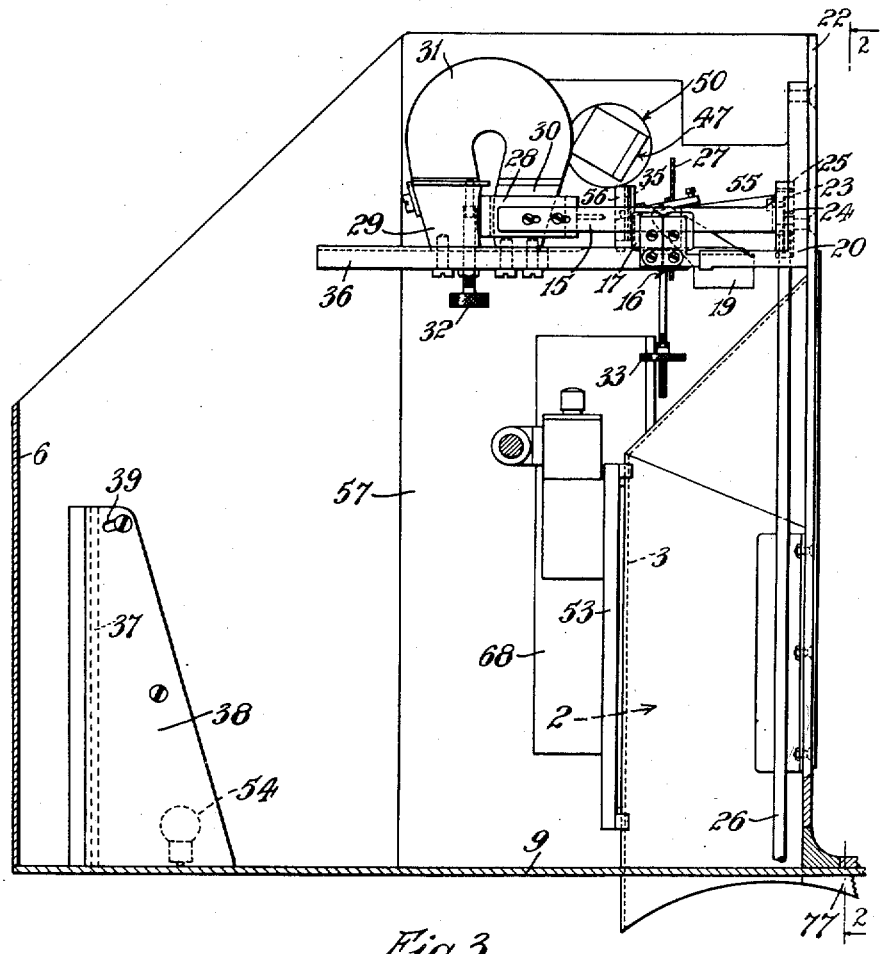
Figure 3 is an end elevation of Figure 2, looking in the direction of the arrow A, and partly in section on the line 3—3 of Figure 2.

Referring now to Figures 2, 3 and 4, the weighing mechanism comprises a weighbeam 15 constructed as a loop and pivoted by a taut wire 16 attached to the beam and stretched across brackets 17 and 18 fixed to a bar 19, which is in turn fixed to brackets 20 and 21 attached to the front plate 22 of the casing 6. At the end near the plate 22 the beam 15 has a clamp 23 screwed to it which is connected by thin springs 24 to a surrounding frame 25, thus forming a shackle.

The pan 1, Figure 1, is suspended from the frame of the shackle by tubular members 26. A small mirror 27 is fixed inside the loop and near to the pivotal axis of the beam. The fixing is shown in detail in Figure 7. At the opposite end of the beam is a copper loop 28 which swings during the beam movements between pole pieces 29 and 30 of a magnet 31 and damps the oscillations of the beam in the known manner. To regulate the damping effect a screw 32 is provided to tilt the magnet, see Figures 2 and 3. For clearness the magnet is omitted from Figure 4. Two further regulators are provided for the beam, consisting of adjustable weights 33 and 34. The weight 33 can be adjusted to alter the centre of gravity of the beam and parts attached thereto, and thus the sensitivity of the weigher, and the weight 34 is adjustable to assist in counter-poising the scale pan and associated parts in conjunction with the weight of the copper loop 28.

A narrow beam of light furnished by an optical device shown in detail in Figures 5 and 6 and described later is directed against the mirror 27 so as to be reflected obliquely downwardly therefrom, and it will be seen that any change in the angular position of the weighbeam and hence of the mirror will cause the light-beam to be reflected at a different angle. The light-beam is directed on to the mirror so when the mirror swings through a certain angle the reflected light-beam moves through twice that angle. Other mirrors are used as described below, and the visible edges of all mirrors are marked by the section lines normally used for glass in order to show them clearly.

Facing the said mirror is a further mirror 35 which is fixed to a bar 36, fixed to the bar 19, and supporting the pole pieces and the magnet. The mirror 35 is fixed in a vertical plane and so placed as to receive the light-beam reflected from the swinging mirror 27 and reflect it again to the swinging mirror. A further fixed mirror 37 is placed a suitable distance behind and below the level of the one just referred to, and faces the swinging mirror in such a position as to receive the light-beam after its second reflection from the swinging mirror. The mirror 37 which is attached by a bracket 38 to the baseplate 9 is of such a size and at such a distance from the swinging mirror as to be able to intercept the light-beam throughout the whole range of angular displacement which it is desired to project on to the screen 3. It will be seen that by the arrangement of mirrors just described in which the light-beam is twice reflected from the swinging mirror, the light-beam received by the last-mentioned fixed mirror 37 moves through an angle four times as great as the corresponding angle through which the weighbeam moves. The mirror 37 is adjustable for angular position by swinging its support bracket 38 through an arc defined by slots in the base of the bracket and by tilting it an amount permitted by a slot 39 in the side of the bracket, see Figure 8.

Figure 6:
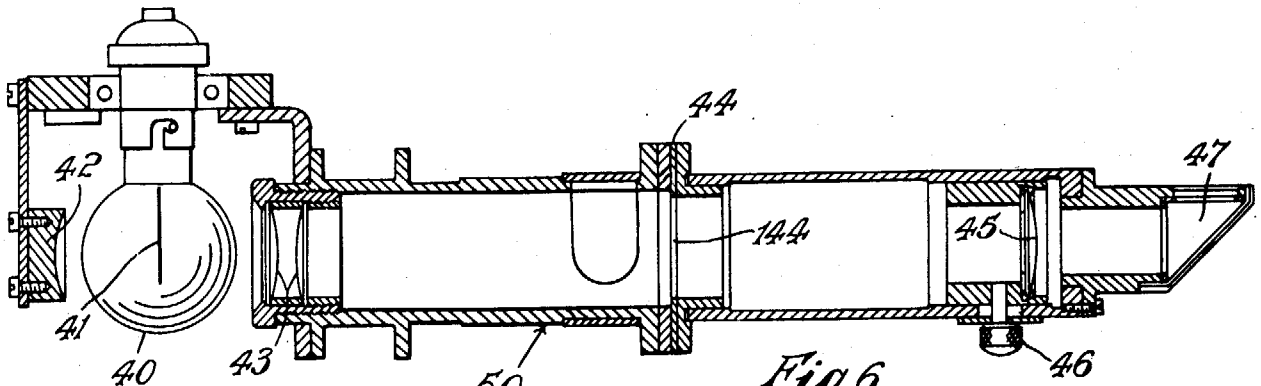
Figure 6 is a vertical sectional view on line 6—6 of Figure 5.
Figure 5:
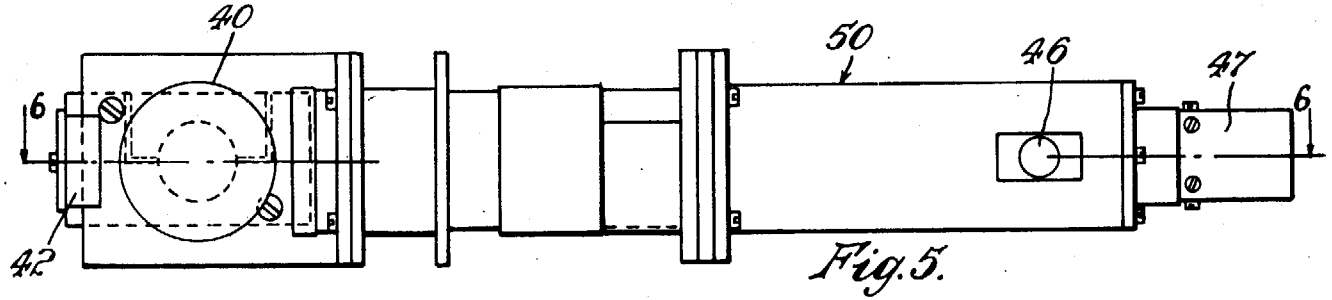
Figure 5 shows a complete plan of the optical tube which is broken away in Figure 4.

Referring now also to Figures 5 and 6, the beam of light is provided by an optical tube generally indicated by the reference 50. Near one end of the tube is an electrical lamp 40 which has a straight filament 41 perpendicular to its base, see Figure 6. The filament passes through the centre of curvature of a spherical mirror 42 located close to the lamp and adjustable relatively thereto, and direct and reflected light is thus directed to a system of lenses in the tube 50 which focuses the light. As shown in Figure 6, two lenses 43 form a condenser by which an enlarged image of the filament is focussed on a narrow slit 144 in an opaque screen 44. Thus the light beam is focused so as to cause a narrow parallel light-beam to pass through the slit. A projector lens 45 is so placed in front of the slit as to project a sharply defined enlarged optical image of the slit on to the translucent screen 3. The lens 45 may be focused by a screw 46. A reflecting prism 47 is located in the path of the light-beam from the slit so as to direct the resulting narrow line of light at a suitable angle against the swinging mirror 27. The lamp 40 is inclined so that the filament is at an angle of 30° to the horizontal (see Figure 4), and the slit is inclined at the same angle as the filament. The prism is also inclined, see Figures 2 and 3, so that the line of light on the mirror 27 is horizontal.

The light-beam is reflected from the fixed mirror 37 on to the translucent screen 3 and its movement up and down the screen is viewed by the operator who sits on the other side of the screen.

To enable this to be done in a convenient way the screen is arranged above the level of the scale pan and directly in front of the operator, and the light beam moving over the screen gives a visual indication to the operator of the deflection of the weighbeam during weighing. The screen 3, which may be graduated to form a scale if desired, is of green translucent material, and by reason of the optical arrangements just described the light-beam as viewed by the operator appears as a narrow band or line of light extending across the width of the screen and moving up the screen as the weight of tobacco in the scale pan increases. At one part of the screen defined by lines 48, Figure 2, the translucent material has a white centre portion W with a red portion R either side. This part, which extends about ⅝" along the length of the screen represents a "zone of tolerance." The parts are so arranged that the light-beam falls on the zone of tolerance when the weight of tobacco in the scale pan is within a selected tolerance, the lower limit of which is the exact weight desired. Thus immediately the desired weight is reached the moving band of light, as viewed by the operator, passes on to the zone of tolerance.

In order to give a still more positive indication to the operator a lamp 52 is placed behind each of the red portions in the zone of tolerance and the parts are so arranged, as will be better understood when the electric controls are described, that the lamps light as soon as the desired weight is reached and remain alight as long as the weight is within the limits of tolerance. This causes the whole of the red portions of the screen to be illuminated as a signal to the operator, while at the same time he can observe the exact position of the light-beam which is still visible as a band of light on the screen between the two portions illuminated red.

Figure 11:
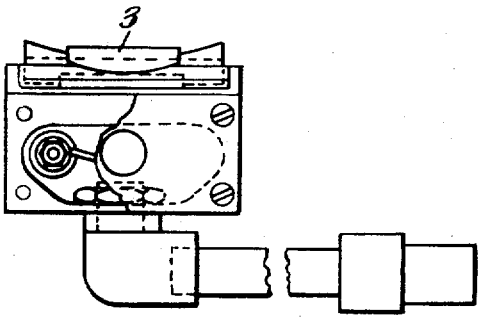
Figure 11 is a plan of Figure 9.
Figure 10:
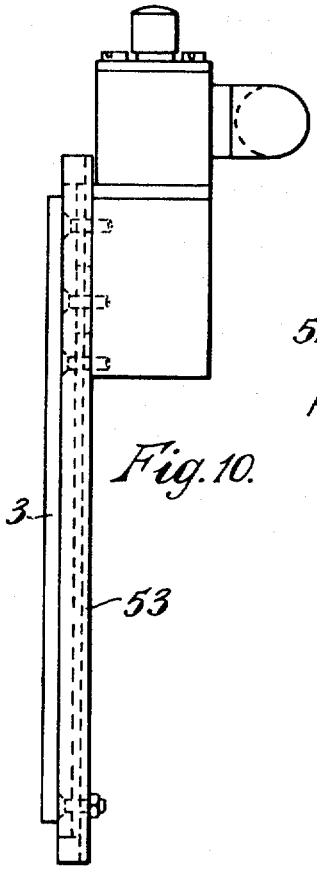
Figure 10 is a side elevation of Figure 9.
Figure 9:
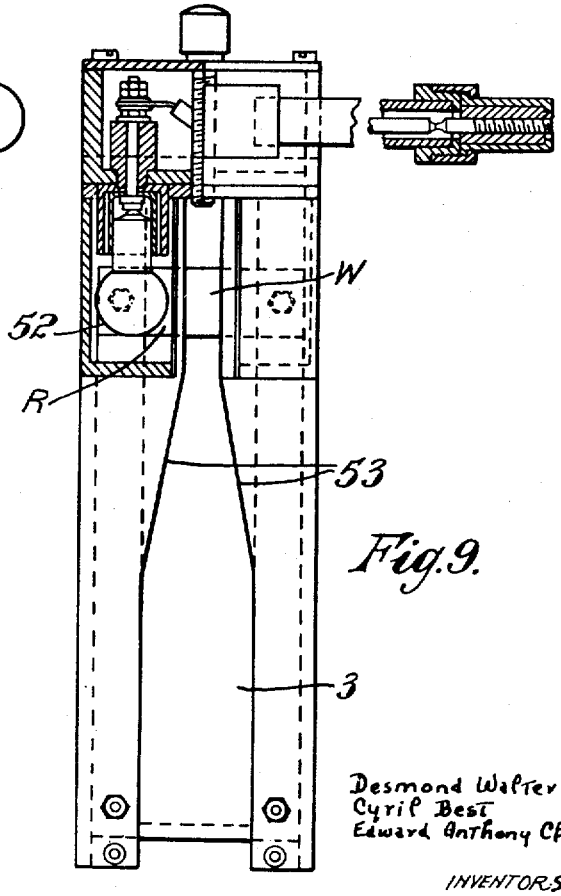
Figure 9 is a front elevation, partly in section of a translucent screen and its associated parts.

The area on the translucent screen 3 over which the light-beam is observed tapers for part of its length towards the zone of tolerance, so that when the light-beam reaches the more sensitive zone, the band of light viewed by the operator is moving up the tapering part of the screen. The purpose of this arrangement is to emphasize to the operator that since the weight is approaching the desired weight, the balance is within its more sensitive range, and consequently only small additional quantities of tobacco must be added to that already in the scale pan in order to reach the desired weight without over-shooting the mark. It is also found that the narrow band of light appears to move up the tapered part of the screen an increasingly greater distance for a given weight and this, it is thought, provides an extra stimulus and a more effective warning to the operator. The tapering of the area of the screen on which the light-beam appears is effected by two suitably shaped plates 53 which mask the screen at the back and define the area over which the light-beam is visible. The general arrangement of the screen and associated parts is best seen in Figures 9 to 11, the fitting shown thereon being fixed to the rear wall of the cavity 2 with the screen 3 projecting into an aperture of the same size made in said wall. The screen is also dimly lit by a background light furnished by a lamp 54 positioned near the rear of the casing, see Figures 3 and 4.

It will be seen that by the arrangements described, a relatively small angular movement of the weighbeam and of the swinging mirror is sufficient to cause a considerable linear movement up or down the screen of the band of light as seen by the operator. This relationship can of course be adjusted to suit the range of weights which it is desired to indicate on the screen and also the size of screen it is found convenient to use.

It is desirable that the operator during weighing should be able to watch the increase of weight of tobacco in the scale pan as it approaches the desired weight. Normally, the weighbeam would not be deflected until the weight had very nearly reached the desired weight, and the movement of the lightbeam up the screen would then be sudden and rapid. It will be seen that by the time this movement took place the operator might have placed too much tobacco in the scale pan. In order to avoid this, provision is made for the weighbeam to start moving as soon as the weight of tobacco in the pan comes within the selected range of weights which can be indicated on the screen. In the case of 1 ounce weighings, this range may, for example, be from ½ ounce or ¾ ounce upwards. For this purpose the scale pan is arranged to be spring-urged downwardly over a limited distance in such a way as to supplement the weight of tobacco and cause the pan to move. A leaf spring 55 is clamped to a bracket 56 which supports the mirror 35 in such a position that its free end presses against the weighbeam so as to tend to urge the scale pan down, see Figures 3 and 4. When a certain quantity of tobacco has been placed in the scale pan the latter begins to move downwardly under the combined influence of the spring and the weight of the tobacco, and this movement continues as more tobacco is added until the weight approaches the desired weight. At this point the weighbeam leaves the spring 55 and assumes its normal sensitivity.

Thus the operator can, by watching the movement of the light-beam up the screen, observe and quickly forecast the approximate amount to be added and so quickly reach the desired weight by progressively diminishing the additions made. As the weight approaches the desired weight the weighbeam becomes more sensitive and therefore the additions made by the operator must be diminished in size.

At the right hand side, Figure 2, of the apparatus the casing is subdivided by partitions to form a compartment 57 in which are housed electric counters 58 and 59 whose figures are visible through the windows 7 and 8, three relays 60, 61 and 62 and two valves or tubes 63 and 64. The operation of these parts will be described later when the circuit diagram is discussed. In order to illuminate the figures of the counters, light from the lamp 40 is directed downwards to the neighbourhood of these figures by strips of transparent material 65, 66 and 67 which transmit the light to their end faces by internal reflection said end faces being cut at such an angle to the incident light that the refracted rays are directed on to the figures. The details are shown in Figure 12.

Figure 14:
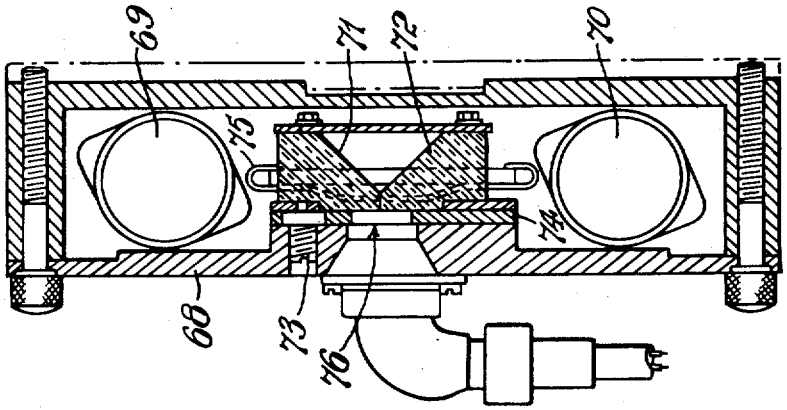
Figure 14 is a section on the line 14—14 of Figure 13.
Figure 13:
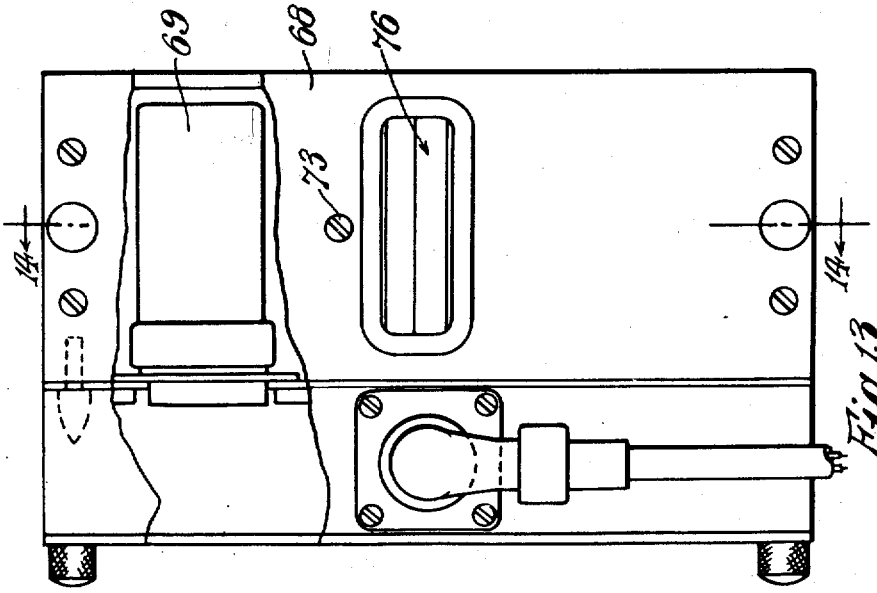
Figure 13 is a front elevation, partly broken away, of a device shown in Figures 2, 3, and 4.

Behind the wall of the cavity 2 and fixed thereto by brackets (not shown) is a box 68 which is the zone adjuster previously referred to. This item is shown in detail in Figures 13 and 14, and in its interior are two photo-electric cells 69 and 70 and two prisms 71 and 72. These prisms can be vertically adjusted by a screw 73 which has an eccentric pin in one end which works in a slot in a plate 74 which carries the prisms. A spring 75 provides a friction grip on the plate 74.

In view of the position of the box it will be appreciated that the light line which moves up and down the screen 3 also sweeps across the parts of the prisms which are exposed through an aperture 76 in the zone box. Thus by shifting the prisms the light is directed on to the photo-cells when the light line is at a different position on the screen 3. As will appear later, these cells control the lamps 52 and sundry interlocking devices, so it will be seen that these lamps and interlocking devices can be made to operate as desired for any predetermined position of the light line on the screen 3 within the distance defined by the line 48, Figure 2, this distance being a zone of tolerance.

From Figures 2 and 3 it will be seen that the wall of the cavity 2 extends below the base plate 9. This is in order to provde a guide for tobacco to be delivered to the scale pan 1, and the guide is completed by an arcuate member 77, Figures 3 and 4, screwed to the base plate. The table 11 and base plate 9 are cut away to form a hole at this position, see Figure 4, and the edges of the hole in the table are rounded and smooth.

Referring now to Figures 15 to 20, it will be seen that the scale pan 1 is provided with lugs 78 at its base which form bearings rotatable on a shaft 79 which is gripped by split lugs 80, fixed to the lower ends of the pan support tubes 26. The scale pan is held in its normal position by a torsion spring 81 Figure 19 which surrounds the shaft 79 and engages the base of the pan and urges the pan into contact with a wire bridle 82. The bridle is frictionally adjustable up and down the support tubes 26 to vary the setting. A roller 83 is rotatably mounted at the end of a curved lever 84 whose other end is fixed to a stud 85. The stud is fixed at its other end to a lever 86 adjustably clamped to a shaft 87, hereafter called the tilting shaft, and operated to tilt the pan periodically by mechanism within the box 14, which mechanism will be described later.

It will be understood that when weighing is taking place the pan must have unrestricted movement within reasonable limits for proper weighing but that during tilting it must be subject to a certain amount of control. Moreover it is desirable that the position taken up by the pan when empty, shall be constant that is the parts return to a definite position of rest. It is also desirable to prevent such a swing of the weighbeam that the light line goes right off the translucent screen. The construction employed to meet all these requirements will now be described.

The pivot shaft 79 of the scale pan extends beyond the split lugs 80 at both ends. Each end moves in a space defined by an inverted V guide 88 which serves to locate the spindle when the scale is at rest. The V guides are adjustable up and down by small capstan screws 89. Beyond the V guide the shaft 79 extends into a square aperture in a plate 90. The V guides 88 and plate 90 are fixed to brackets 95 screwed to the underside of the base plate 9 and as the lower end of the bracket 95 is rather obscure in Figure 16 the construction is shown in detail in Figure 18 and a sectional view thereof in Figure 20. This plate serves to limit the possible downward movement of the pan, the permitted movement being ample for proper weighing operations.

Figure 15:
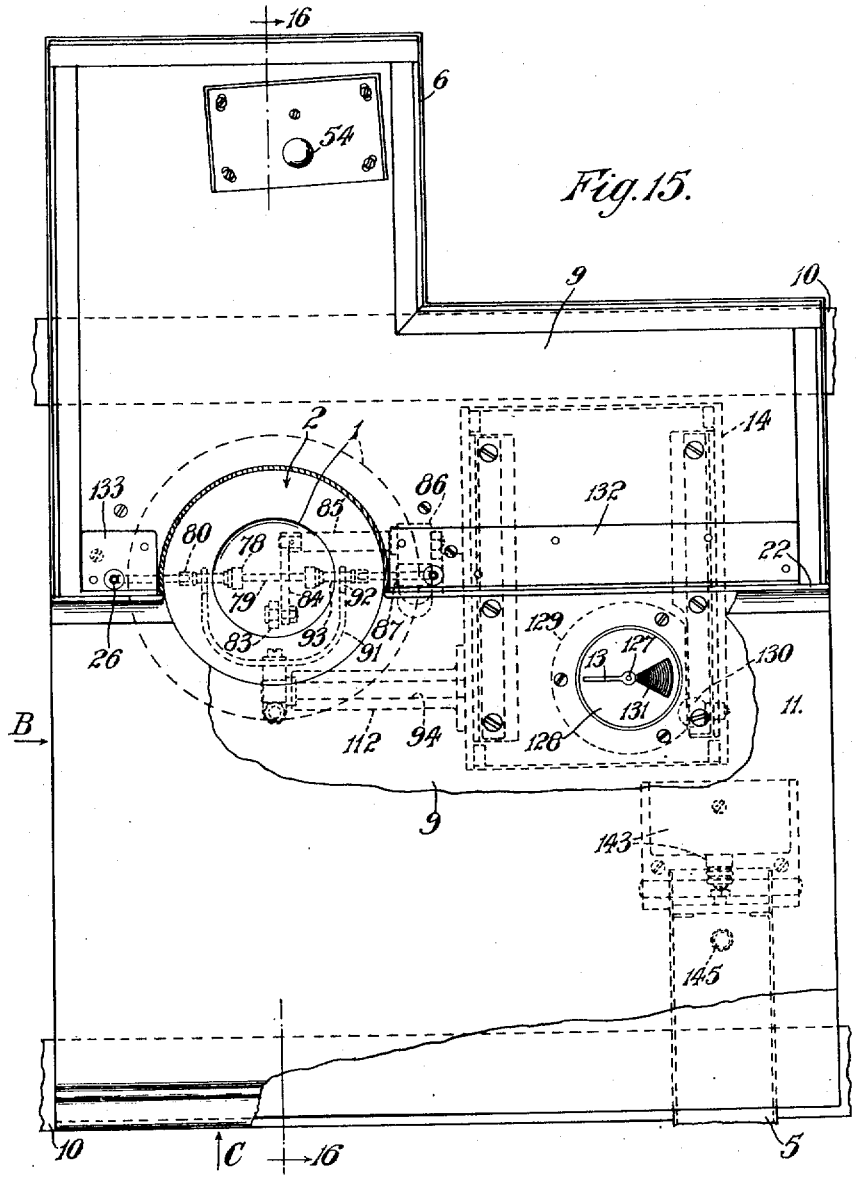
Figure 15 is a general plan of the base plate, casing and table showing the general lay out of the parts located on the base plate.
Figures 19, 20:
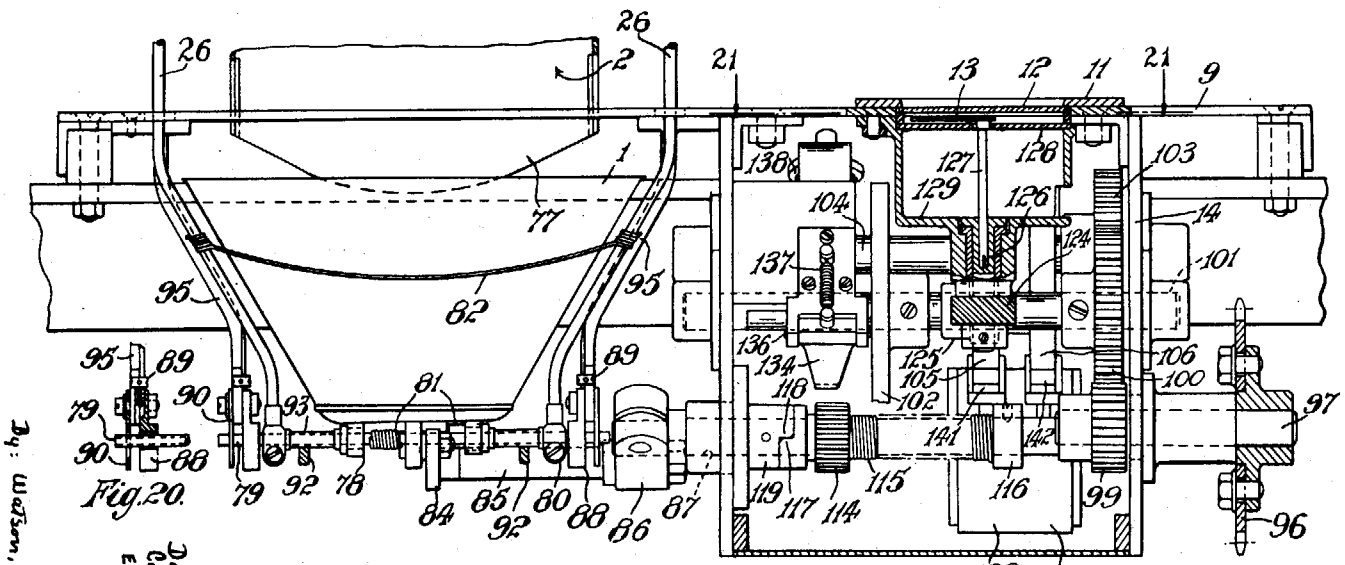
Figure 19 is a view of Figure 15 in the direction of the arrow C, partly in section, and some parts being omitted.
Figure 20 is a detail sectional view on line 20—20 of Figure 18.
Figure 21:
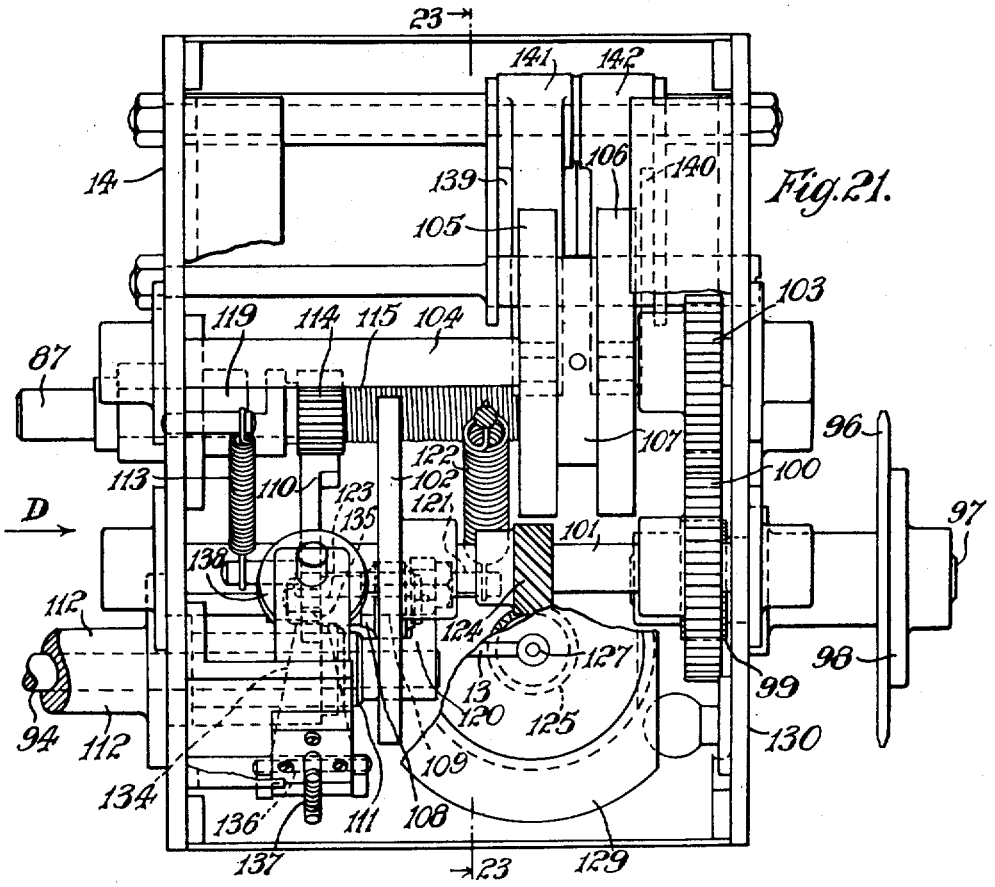
Figure 21 is a plan of a box containing operating mechanism and fixed beneath the base plate, taken approximately on line 21—21 of Figure 19.

When tilting is to take place the shaft 79 functions as a pivot or hinge pin and to locate this in a more or less fixed position there is provided a device 91 termed a holder fork having ends 92 which move up and engage bushes 93 mounted on the shaft 79. The fork is fixed to a shaft 94 which is operated to swing through a small arc at each tilting operation by mechanism within the box 14 and as tilting takes place, the shaft 79 moves up into the inverted V guides and is then supported underneath by the holder fork ends 92 so that the shaft is practically hinged about the shaft axis. The extent of the tilting movement may be seen in Figure 16 where the tilted pan is shown in chain lines. In Figure 15 there are also shown angles 132 and 133 which fixe the front plate 22 to the base plate and markings 131 on the dial 128 which will be referred to again when the action is described.

Referring now to Figures 19 to 23 the mechanism inside the box 14 is driven by a sprocket wheel 96 fixed on a shaft 97 journalled in a bearing fixed to a wall of the box. The sprocket wheel is adjustable on its boss 98 but this is only for timing the apparatus when several sets are working in a battery and may be disregarded. Inside the box a small gear wheel 99 is fixed to the shaft 97 and meshes with a larger gear wheel 100 fixed to a shaft 101 which is supported in bearings fixed to the walls of the box. This shaft has a cam 102 fixed therein and is hereafter termed the cam shaft. The gear wheel 100 also engages an equal gear wheel 103 fixed on a shaft 104 also journalled in bearings fixed to the walls of the box and on this shaft are two switch-operating cams 105 and 106, and the shaft 104 will be hereafter termed the switch cam shaft. The cams are fixed on a boss 107 which is pinned to the shaft 104 and are mutually adjustable, see Figure 23.

The cam 102 engages a roller 108 which is mounted on a pin 109 fixed to a toothed quadrant 110 which is pivoted on a long boss 111 extending from a bearing 112 in which the holder shaft 94 is journalled. As the cam rotates, the quadrant swings through an arc under the influence of the cam and a return spring 113. The teeth of the quadrant engage a small gear wheel 114 mounted on the tilting shaft 87, which is also journalled in bearings fixed to the box walls. The gear wheel 114 is loose on the shaft 87 and is attached to one end of a torsion spring 115 surrounding the shaft and having its other end attached to a collar 116 fixed to said shaft. The gear wheel has a 90° dog 117 on it which engages with a similar dog 118 on a collar 119 fixed to the shaft 87. Normally, oscillation of the quadrant causes the tilting shaft to rock to and fro and tilt the scale pan and allow it to return under the influence of the spring 113 but if an operator puts her hand into the path of the moving pan the pan will be arrested and the spring 115 will wind up a little until the obstruction is removed. This device is to prevent accidents.

The end of the holder shaft 94 inside the box 14 has a curved lever 120 fixed to it and at the free end of the lever is a long spring pin 121. One end of the pin its attached to a spring 122, while the other end 123 extends beneath the quadrant and engages with the edge thereof. Thus as the quadrant oscillates, the holder shaft 94 will also oscillate as the spring 122 causes the end 123 of the spring pin to follow the quadrant. In this way the tilting and holder shafts move in timed relationship for the purpose of tilting and controlling the scale pan as previously described.

On the cam shaft 101 there is also fixed a spiral gear wheel 124 which engages a similar wheel 125 on a vertical shaft 126 to which a spindle 127 is fitted, the upper end of the spindle carrying the previously mentioned hand 13 which moves over a dial 128. The pointer and dial are contained in a casing 129 fixed to the underside of the base plate 9 and the casing is cut away as shown near a lamp 130 so that the dial is illuminated.

Figure 22:
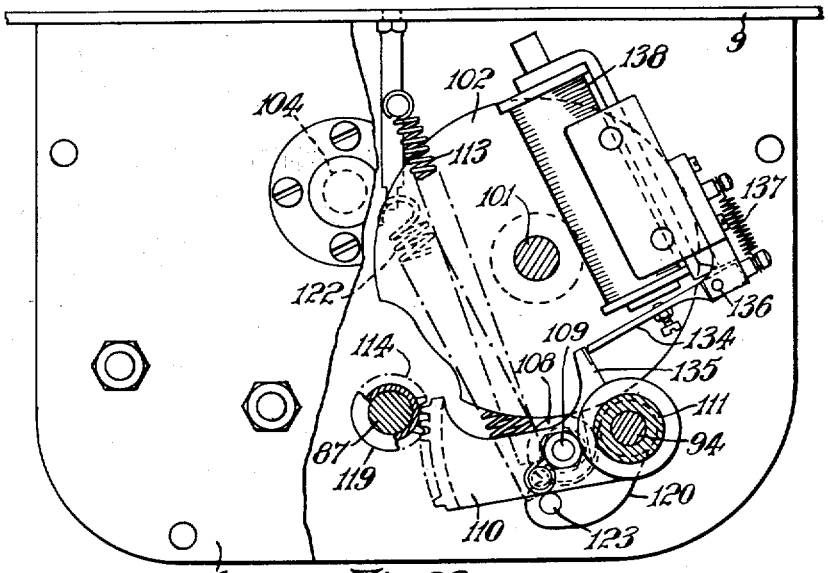
Figure 22 is a view of Figure 21 in the direction of the arrow D and partly broken away to show parts immediately behind the casing wall.
Figure 23:
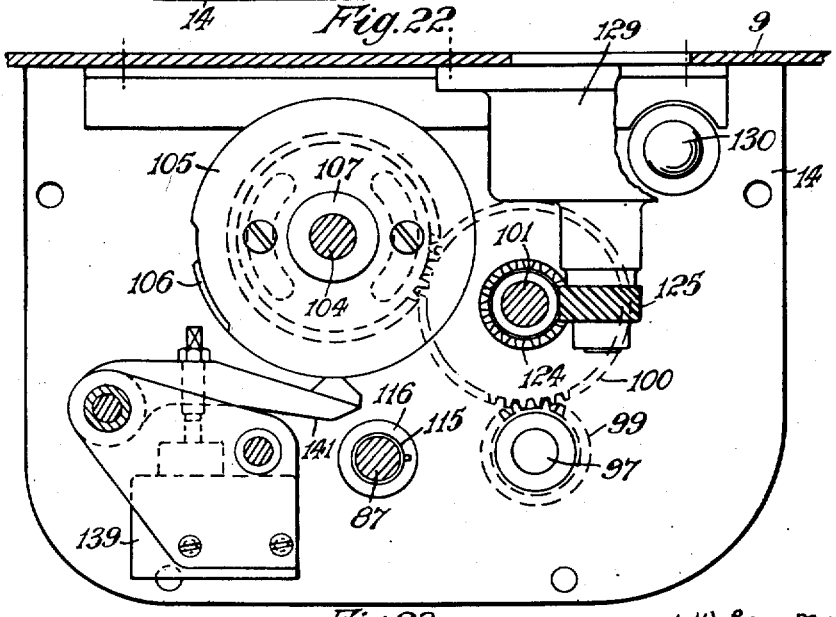
Figure 23 is a view of Figure 21 on the line 23—23.

The movement of the quadrant and thus the tilting of the pan can be checked by a pawl 134 Figure 22 which engages an abutment 135 on the quadrant. The pawl is pivoted at 136 and held in the operative position by a spring 137 but it can be raised to clear the abutment and allow tilting to take place by an electro-magnet 138 which attracts the pawl against the influence of its spring when current passes through the coil of the magnet.

In the casing 14 there are also two spring switches 139 and 140 which are operated at times by the cams 105 and 106 through pivoted cam levers 141 and 142.

In addition to the control devices within the box 14 there is a switch 143 secured beneath the base plate 9 and operated when the pad 4 is pressed to move the lever 5 the return movement being by a spring 145 Figure 16.

The general manipulation of the scale for weighing and the consequent movements of the weighbeam should be clear from the foregoing description, but it is now necessary to explain the purpose of the markings 131 on the dial 128. These markings cover a sector of a circle and indicate an angle over which the pointer 13 travels. During this part of the pointer movement, tilting of the pan is taking place as at this time the roller 108 is engaging the depressed part of the tilting cam 102. The marked dial and pointer are useful during setting up and testing of the apparatus and when operators are being trained, and in general operation to warn an operator to press the pad 4 before the pointer reaches the marked sector. A complete revolution of the hand over the dial is the time allowed for a complete cycle of operations, which is the same as the time between the end of one tilting operation and the next, for as soon as the pan is back and the red light goes out, the operator starts putting in tobacco.

Figure 24:
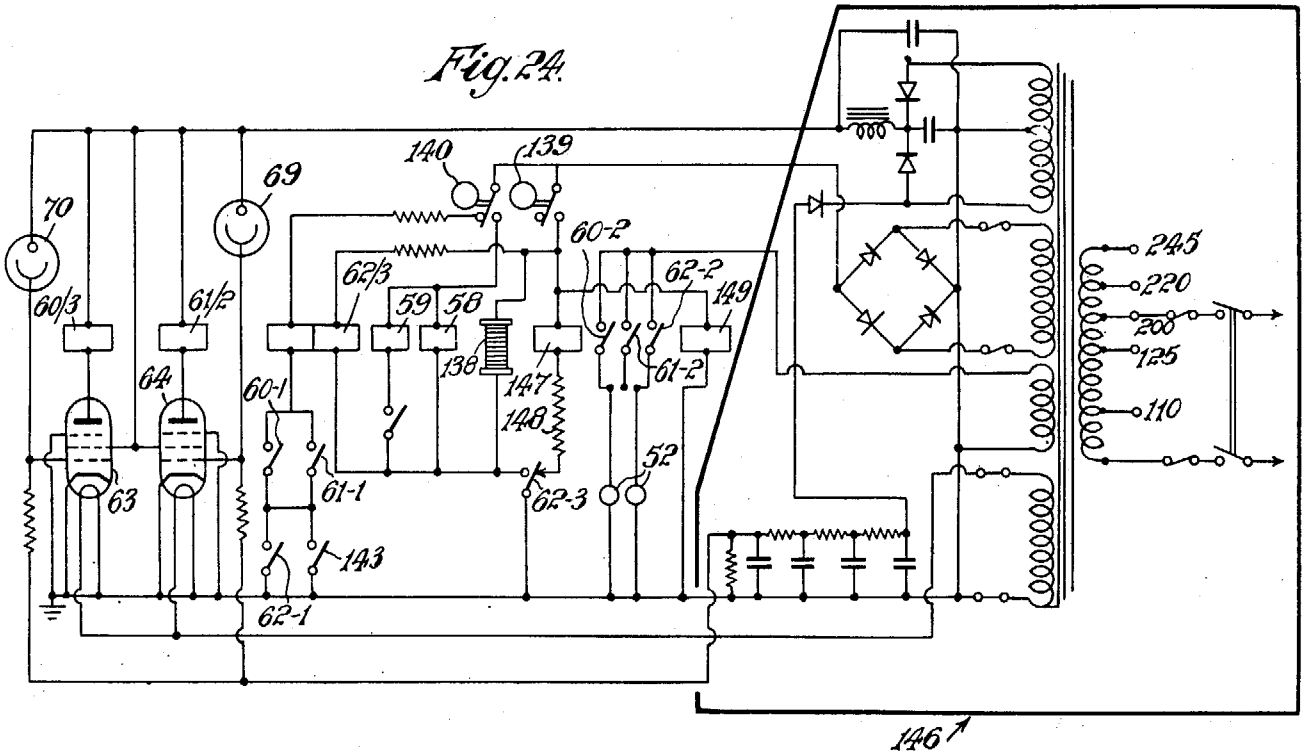
Figure 24 is a diagram of the connections of electrical devices used in the apparatus.

The action of the whole apparatus will now be explained with reference to Figure 24 as well as to the other figures. Referring first to Figure 24, 146 indicates normal electrical devices for converting power from A. C. mains to supply voltages to the grids, plates and filaments of the tubes 63 and 64, the electrodes of the light cells 69 and 70, and current for other details. The relays 60, 61, 62 in the compartment 57 are here marked with suffixes indicating the number of contacts viz. 60/3—61/2—62/3. The relay 62/3 has two windings forming separate energizing coils.

Neither the electric circuit nor the timing is as simple as might be at first thought because it has been necessary to arrange the circuits so that the operating switch 143 may be effectively pressed at any time in the cycle after at least correct weight of tobacco is in the pan. If pressed before this it does nothing. The switch must be pressed for nearly 0.2 second to ensure operation but this presents little difficulty. There are two types of cycles to consider.

1. The normal cycle

This is when the weighing is completed in time for the pad 4 which operates the switch 143 to be pressed before the depression in the tilting cam has reached a position where it can engage the roller so that tilting takes place at the desired time, that is as the roller follows down the cam depression. In other words, weighing is done and the switch is pressed before the hand reaches the dial markings.

2. The abnormal cycle

This is when the weighing has not been completed and the operating switch pad has not been pressed before the depression in the tilting cam has reached the position where it should engage the roller, that is, before the pointer has reached the marked sector of the dial, and this failure results in lost time of up to one whole cycle, that is, though the pad may then be pressed, tilting cannot take place until the cam has revolved once more to bring the beginning of the depression against the roller. Sometimes the operating switch is pressed during the time the depression on the tilting cam is in a position where it should engage the roller, that is, during the time that the pointer is covering the shaded portion of the dial, and it is this condition which complicates the circuit because it is imperative that the pan should not be allowed to commence tilting at any time during this period except of course at the start of the normal tilting period; otherwise the pan would either suddenly tilt without the restraint provided by the cam track or alternatively, if it is started to tilt very late it would return before it had had time to empty itself completely.

If the swing of the light beam is such as just to activate the light cell 70, the tube 63 will be affected and the relay 60/3 will operate. Contact 60—2 closes and the lamps 52 light and warn the operator that enough tobacco is in the scale pan. Contact 60—1 closes and, if the pad 4 is pressed to close switch 143, the relay 62/3 operates as the circuit through the left-hand coil is completed. Thus the contact 62—3 is closed to provide a circuit for the magnet 138 when, in due course, the circuit is completed by the action of the timing switch contact 139.

Contact 62—1 closes and forms a hold-on circuit for relay 62/3 as switch 143 opens when the pad 4 is released and contact 62—2 closes and form an alternative circuit for the lamps 52.

If, however, the operator has put more tobacco in the pan than is strictly essential the light cell 69 will be activated in succession to cell 70 (relay 60/3 becoming inactive as the light beam passes to 69) and relay 61/2 will operate. Contact 61—2 will close and retain the circuit for the lamps 52. Contact 61—1 closes and if the pad 4 is pressed to close switch 143, the relay 62/3 operates whereafter circuits are established by contacts 62—1 and 62—2.

Conditions during normal cycle

If as stated above at some point in the cycle, after weighing, the pad 4 controlling the operating switch is pressed and if the weight is correct that is within the tolerance, at least one light cell is activated and continues active and relay 62/3 locks in and contact 62/3 changes over.

At the end of the normal weighing period the cam operated timing switch contacts 139 and 140 change over (139 just before 140) and this allows the tilting magnet 138 to be energised. The locking pawl 134 is attracted to the magnet and allows the tilting mechanism to operate as soon as the depression in the tilting cam comes round to the roller. For the pawl 134 to move it must be free and therefore switch 139 is timed to change over about 5° before the depression in the tilting cam reaches the position of engagement with the roller. Switch 140 changes over about 2° after switch 139 and during the time that this is changed over the counters 58 and 59 operate and switch 140 remains over for about 8° which is long enough for this purpose. Counter 59, which is an efficiency counter, only works if the light beam has not passed beyond the light cell 70. Counter 58 shows the total number of weighings.

After the end of the tilting period, switch 139 changes back, the "red" lights 52 go out and all is ready for a new cycle to commence.

Abnormal cycle

This is if the weighing has not been completed at the end of any particular cycle. As stated above, the operating switch pad may be pressed at any time after this, including the period of the tilting cam depression passing the cam roller. If it is pressed during this period then as 139 is changed over and contact 62—3 is closed the tilting magnet becomes energised, but tilting does not take place because the pawl 134 is no longer free to move as it is locked by the abutment 135 which is pulled hard against it by the spring 113 when the cam roller is over the depression. At the end of the tilting period the pawl is freed and relay 62/3 remains energized and tilting takes place normally at the end of the next cycle.

Supposing that the operator has put too much tobacco in the pan (that is a quantity outside the tolerance) the light beam will go beyond the cell 69 and the lamps 52 will go out and the relay 61/2 will cease to be energised, so pressing the pad 4 will have no effect and the pan cannot tilt until some tobacco has been removed. If this is done promptly, tilting will take place in the next cycle.

It will also be seen that alternative circuits are provided for relay 62/3 through its two cores and timing switches 139 and 140. This is to hold the circuits intact when owing to tilting the weight changes and the light beam goes away from the light cells. Switch 139 stays changed over during the whole tilting operation, thus energising magnet 138 and relay 62/3 so that lights 52 keep on. Switch 139 changes over before 140 so as to keep relay 62/3 active while the circuit through switch 140 is broken, but 140 only goes over just long enough to work the counters 58 and 59 and makes the circuit irresponsive to closing of 143 during this period. While it is over, pressing the pad has no effect, and so if the tilting magnet has not been energised during the proper period then the magnet cannot operate until the pawl is no longer locked against the abutment. With this arrangement, tilting always starts at the proper time or is effectively prevented. During tilting the light beam goes off the screen but the red light remains on by the circuit through 62—2. After the tilting is completed and pan is back the circuit through 62/3 ceases as switch 139 returns to the position shown.

If, during weighing, the light beam passes the light cell 70 and the operator decides to remove some tobacco from the pan to get a closer weighing, and removes so much that the beam swings below the cell, it will be necessary for the operator to press the pad 4 again (assuming that this was done in the first instance) because as the beam moves down, the cell becomes inert and all affected relays deenergised.

The part 148 is a resistance in series with a magnet 147. The resistance is only provided because the coils of the magnet 147 (a commercial product) require it and it is unnecessary if a magnet suitable to the circuit is made. The magnet is used to stop the paper feed in a packing machine when a tilting operation does not take place, but it is of no importance in the mere weighing of parcels of tobacco. 149 is an electric counter which counts the total revolutions of the cam shaft which can be compared with the figure recorded by the counter 58 which shows the total number of weighings done, to see if the apparatus is being worked to capacity.

The indicating device described where the moving light causes the lamps 52 to be lit or extinguished has the advantage that the operator is relieved of the sometimes difficult task of determining by his own judgment when the greater portion of the band of light has crossed the dividing line, indicating that the correct amount of material has been put into the scale pan, since this is indicated with complete accuracy and without ambiguity by the lamp signal device which does not operate until the correct weight has been reached. Thus individual errors, as for example in reading a scale, can be eliminated. Further, although the weight may be within the limits of tolerance, it is possible for the operator, by observing the position of the light band on the screen, to see that the weight may be slightly above what is desired, and in that case he can remove enough tobacco from the scale pan to bring the weight down to the desired weight or nearly so, knowing that as long as the lamp signal is alight the weight is still within the limits of tolerance. It will also be seen that the system of indicating by the movement of light over a screen eliminates the possibility of errors or difficulties in judgment due to parallax such as might be present, for example, in a case where the operator has to watch the movement of a pointer over a scale.

It will also be seen that by using a reflector to indicate the deflection of the weighbeam by the deflection of a reflected light-beam, it is possible to increase the speed of weighing, since the inertia of the weighbeam is increased only very slightly by the addition of a small reflector at or near the centre of rotation of the weighbeam, and moreover the weighbeam can have comparatively short arms, thus reducing inertia. It is nevertheless possible, by the reflecting system described, to provide an indicator in which the movement of the weighbeam is considerably multiplied, and this can be done according to the invention without adding to the weight of the weighbeam (other than the small weight of the reflector) and without friction. If the deflection of the weighbeam were measured by a pointer or arm on the weighbeam moving over a scale, it would be necessary to make the arm approximately six feet long in order to obtain the same multiplication as is obtained in the construction described.

By use of a light-sensitive cell, it is possible to actuate the interlocking mechanism for the scale pan without any disturbing contact with the weighbeam, and there is no mechanical interference with the weighbeam other than that involved by the tipping of the scale pan.

By the addition of further light-sensitive means such as the cell 70 located to operate within say the first quarter of the selected limits of tolerance, the counter 59 (or a visual or audible signal) indicates when weighings are exceptionally good, i. e. almost correct weight. This assists in selecting the most expert operators, and may also be used for incentive bonus purposes. Weighings must not be underweight, but obviously if the lower boundary of the acceptance zone represents correct weight, then the closer one brings the light-beam to the lower boundary the greater the saving of tobacco.

What we claim as our invention and desire to secure by Letters Patent is:

1. Weighing mechanism having a scale pan into which the substance to be weighed is placed by an operator, a weighbeam supporting said pan, a mirror on the weighbeam, a light sensitive cell, a fixed light source comprising means to form a line of light and direct it on to said mirror and thence to said light sensitive cell, mechanism operating in timed cycles adapted, [in response to a signal by an operator, and] during a predetermined part of each such cycle, to discharge a loaded scale pan, so that the pan is discharged at a predetermined time in said cycle, and means controlled by the light cell to prevent such discharge unless the pan contains at least the desired weight.

2. Weighing mechanism as claimed in claim 1 comprising a further mirror positioned to intercept light reflected by the weighbeam mirror and reflect it again to the weighbeam mirror which thereupon reflects it to the light sensitive cell.

3. Weighing mechanism as claimed in claim 1 wherein said mechanism operating in timed cycles comprises a cam rotatable once per cycle, a lever coupled to the pan for tilting it to discharge its contents, a cam follower on the lever and a spring for urging the follower into contact with the cam to cause movement of the lever during the said predetermined part of the cycle and tilting of the pan to discharge its contents at the predetermined time.

4. Weighing mechanism as claimed in claim 3 comprising a stop to engage said lever and prevent its movement by the spring, an electromagnet for moving the stop to permit lever movement, and means for energizing the magnet to effect movement of said stop, said last named means being controlled by the light cell.

5. Weighing mechanism as claimed in claim 1 *in which said discharging mechanism is operated in response to a signal by an operator, and which comprises* [comprising] means for renderng the operator's signal ineffective if the signal is made during said predetermined part of each cycle.

6. Weighing mechanism as claimed in claim 1 comprising a dial, and a pointer rotating over said dial once per cycle, said dial having a marked sector corresponding to said predetermined part of the cycle.

7. Weighing mechanism as claimed in claim 1 comprising a visual indicator consisting of a screen over which part of the line of light moves and a lamp controlled by the light cell for illuminating a part of said screen when the pan is loaded with at least the desired weight.

8. Weighing mechanism as claimed in claim 7 wherein the illuminated part extends to form a zone of tolerance and the light cell causes the lamp to be extinguished when the weight in the pan is above the permitted tolerance.

9. Weighing mechanism as claimed in claim 1 and wherein the light from the weighbeam mirror is transmitted to a light cell through a prism, two such prisms being provided to direct light to two light sensitive cells, the two prisms jointly defining a wide zone of tolerance and one of them a narrower zone of tolerance, whereby weighings within the narrower zone may be separately recorded by devices controlled by the light cell appertaining to said narrow zone.

DESMOND WALTER MOLINS.
CYRIL BEST.
EDWARD ANTHONY CHANDLER.

References Cited in the file of this patent or the original patent

UNITED STATES PATENTS

| Number | Name | Date |
|---|---|---|
| 1,321,361 | Brown | Nov. 11, 1919 |
| 2,022,659 | Fisher | Dec. 3, 1935 |
| 2,322,813 | Beck | June 29, 1943 |
| 2,323,372 | Bryce | July 6, 1943 |